(12) United States Patent
Yun et al.

(10) Patent No.: US 9,523,797 B2
(45) Date of Patent: Dec. 20, 2016

(54) MICROLENS ARRAY FILM AND DISPLAY DEVICE INCLUDING THE SAME

(71) Applicant: Electronics and Telecommunications Research Institute, Daejeon (KR)

(72) Inventors: Sung Ryul Yun, Daejeon (KR); Ki-Uk Kyung, Daejeon (KR); Suntak Park, Daejeon (KR); Bong Je Park, Daejeon (KR); Young Sung Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 183 days.

(21) Appl. No.: 14/029,188

(22) Filed: Sep. 17, 2013

(65) Prior Publication Data
US 2014/0085865 A1   Mar. 27, 2014

(30) Foreign Application Priority Data

Sep. 21, 2012 (KR) .................. 10-2012-0105434
Mar. 5, 2013 (KR) .................. 10-2013-0023134

(51) Int. Cl.
*G02B 3/00* (2006.01)
*F21V 33/00* (2006.01)

(52) U.S. Cl.
CPC ......... *G02B 3/0006* (2013.01); *F21V 33/0052* (2013.01); *G02B 3/0043* (2013.01); *G02B 3/0056* (2013.01)

(58) Field of Classification Search
USPC ......... 340/407.2, 815.52; 359/619–628, 290; 348/E9.026; 349/95
See application file for complete search history.

(56) References Cited

U.S. PATENT DOCUMENTS

| | | | | |
|---|---|---|---|---|
| 5,493,427 A * | 2/1996 | Nomura | .................. | G02B 3/005 348/59 |
| 6,392,726 B2 * | 5/2002 | Goto | .................. | G02F 1/133371 349/86 |
| 6,953,268 B2 * | 10/2005 | Kimura | ............... | G03F 7/70275 348/E5.139 |
| 7,245,439 B2 * | 7/2007 | Kuiper | ..................... | G02B 3/08 359/665 |
| 7,944,617 B2 * | 5/2011 | Ishioka | ................ | G02B 26/004 359/665 |
| 8,264,625 B2 * | 9/2012 | Lin | ........................ | G02F 1/1347 349/15 |
| 8,408,754 B2 * | 4/2013 | Tsuchiya | ................... | F21V 5/04 362/318 |

(Continued)

FOREIGN PATENT DOCUMENTS

| KR | 10-2005-0087252 A | 8/2005 |
|---|---|---|
| KR | 10-2008-0043610 A | 5/2008 |

(Continued)

*Primary Examiner* — Renee Chavez
*Assistant Examiner* — Christopher E Dunay
(74) *Attorney, Agent, or Firm* — Rabin & Berdo, P.C.

(57) ABSTRACT

Provided are a microlens array film and a display device including the same. The microlens array film includes a first transparent electrode and a second transparent electrode facing each other and a flexible polymer layer placed between the first and the second transparent electrodes. Lenses may be freely deformed by regulating voltages applied to the first and second transparent electrodes.

13 Claims, 14 Drawing Sheets

(56) References Cited

U.S. PATENT DOCUMENTS

| | | | | |
|---|---|---|---|---|
| 8,498,053 | B2* | 7/2013 | Futterer | G02B 26/005 |
| | | | | 359/573 |
| 8,576,490 | B2* | 11/2013 | Bae | G02B 3/0056 |
| | | | | 359/228 |
| 8,755,124 | B2* | 6/2014 | Aschwanden | G02B 3/14 |
| | | | | 359/665 |
| 8,982,445 | B2* | 3/2015 | Kim | G02B 26/005 |
| | | | | 359/290 |
| 9,207,367 | B2* | 12/2015 | Wang | G02B 3/14 |
| 2011/0096071 | A1* | 4/2011 | Okamoto | G02B 27/2214 |
| | | | | 345/419 |
| 2012/0026430 | A1* | 2/2012 | Chen | G02B 6/0016 |
| | | | | 349/65 |
| 2012/0026593 | A1 | 2/2012 | Yoshimura et al. | |
| 2012/0250151 | A1* | 10/2012 | Lee | G02B 27/2214 |
| | | | | 359/463 |
| 2015/0160452 | A1* | 6/2015 | Aridomi | G02B 26/005 |
| | | | | 359/290 |
| 2015/0160738 | A1* | 6/2015 | Lithwick | G06F 3/042 |
| | | | | 345/170 |

FOREIGN PATENT DOCUMENTS

| | | |
|---|---|---|
| KR | 10-0924231 B | 11/2009 |
| KR | 10-2011-0118731 A | 10/2011 |

* cited by examiner

MICROLENS ARRAY FILM AND DISPLAY DEVICE INCLUDING THE SAME

CROSS-REFERENCE TO RELATED APPLICATIONS

This US non-provisional patent application claims priority under 35 USC §119 to Korean Patent Application Nos. 10-2012-0105434, filed on Sep. 21, 2012 and 10-2013-0023134, filed on Mar. 5, 2013, the entirety of which is hereby incorporated by reference.

BACKGROUND OF THE INVENTION

Exemplary embodiments of inventive concepts relate to microlens array films and display devices including the same.

With the advance in display technology applied to various types of terminals such as mobile phones, navigation systems, digital information displays (DIDs), and tablet PCs, projectors, and television sets that are now currently on the market, not only high-resolution screen but also three-dimensional (3D) images or virtual images may be provided. Virtual screen technology employs a projection method based on laser a light source, a micromirror array, and a microlens array. Currently, a user may recognize a position when the user comes close to or touches a specific portion of a virtual screen through linkage of an infrared sensor. Accordingly, the technology has been applied to develop virtual keyboards capable of overcoming touch error or inconvenience of writing documents or texts which may result from miniaturization of computers or mobile terminals. In addition, 3D images have been mainly obtained by a stereoscopic method which provides 3D effect by implementing perspective resulting from visual disparity of images perceived by two eyes. However, since the stereoscopic method obtains stereoscopic images with depth of the front, there is a technical limitation that the 3D effect is clearly distinguished according to an image viewing angle. In addition, viewers suffer from disadvantages such as eye fatigue and dizziness when they watch a 3D screen. Meanwhile, a holographic technology allows omnidirectional 3D effect to be implemented to the level equivalent to an actual image of object. For this reason, the holographic technology has been attracting attention to implement a 3D display without wearing auxiliary equipment.

In order to implement a virtual screen or 3D images similar to actual images on various types of electronic devices, it is necessary to use a microlens array that is designed to meet their needs. Currently, passive lens layers standardized depending on purposes have been used. Currently, a microlens structure has been manufactured by variously methods such as a laser induced dry etching method, a method using a reflow phenomenon of a polymeric substance, a photolithography method using a diffuser, a laser chemical deposition method, and a focused ion beam (FIB) milling method. The method using a reflow phenomenon has been mainly used due to advantage in manufacturing lenses of various sizes, easy control, low production costs, and simple process. This method includes forming a cylindrical photoresist pattern on a substrate and applying heat to a resultant structure to manufacture a spherical lens based on surface tension. However, the spherical lens is vulnerable to heat and shock, i.e., poor in durability, flexibility of the spherical lens is not ensured, and the spherical lens is strongly affected by an external environment. In order to overcome these disadvantages, a method of transcribing a lens-shaped structure to a substrate by reactive ion etching (RIE) and an imprinting method using a PDMS mold and UV cured polymer have been used. Unfortunately, the former requires additional polishing because of a problem in surface roughness after using RIE, and both the former and the latter may be applied only to manufacturing of passive lenses and still have difficulty in manufacturing a microlens array with ensured flexibility in terms of characteristics of a structure material.

SUMMARY OF THE INVENTION

Exemplary embodiments of inventive concepts provide microlens array films and display devices including the same.

A microlens array film according to an embodiment of the inventive concept may include a first transparent electrode and a second transparent electrode facing each other; and a flexible polymer layer placed between the first and the second transparent electrodes. At least one of the first and second transparent electrodes is flat.

In an exemplary embodiment, the flexible polymer layer may include a first surface and a second surface facing each other. The first surface is flat, and the second surface is non-planar. The second transparent electrode may be provided in plurality. The second transparent electrodes may be spaced apart from each other and cover convex faces of the second surface, respectively. And/or the first transparent electrode may be provided in plurality. The first transparent electrodes may be spaced apart from each other and overlap non-planar portions of the second surface, respectively.

In an exemplary embodiment, at least one of the first and second transparent electrodes is flexible.

In an exemplary embodiment, the microlens array film may further include a first substrate being in contact with at least a bottom surface of the flexible polymer layer; and a second substrate being flexible and in contact with at least a top surface of the flexible polymer layer.

In an exemplary embodiment, the first transparent electrode, the flexible polymer layer, and the second transparent electrode may constitute a single unit operating part. The microlens array film may include a plurality of unit operating parts disposed to be spaced apart from each other between the first and second substrates. At least one of the first and second transparent electrodes may extend to cover at least one of a top surface of the first substrate and a bottom surface of the second substrate.

In an exemplary embodiment, the first transparent electrode, the flexible polymer layer, and the second transparent electrode may constitute a single slit-type sub-unit operating part. The microlens array film may include a plurality of sub-unit operating parts constituting a single unit operating part. An upper end of the flexible polymer layer adjacent to the center of the unit operating part may be higher than an upper end of the flexible polymer layer adjacent to the edge of the unit operating part.

In an exemplary embodiment, the first substrate may be transparent and flexible.

In an exemplary embodiment, the flexible polymer layer may be made concave laterally when voltages of opposite signs are applied to the first and second transparent electrodes, respectively. Alternatively, width of the flexible polymer layer adjacent to the second substrate is made smaller than that of the flexible polymer layer adjacent to the first substrate when voltages of opposite signs are applied to the first and second transparent electrodes, respectively.

In an exemplary embodiment, the microlens array film may further include a reflection layer covering the first transparent electrode or the second transparent electrode.

In an exemplary embodiment, the microlens array film may further include an optical element layer being flexible and in contact with a top surface or a bottom surface of the flexible polymer layer.

In an exemplary embodiment, a distance between the first transparent electrode and the second transparent electrode may be reduced by applying voltages of opposite signs to the first and second transparent electrodes, respectively.

A display device according to an embodiment of the inventive concept may include the above-described microlens array film; and a light source unit adjacent to the microlens array film.

In an exemplary embodiment, the light source unit may include a light source element, an optical waveguide adjacent to the light source element, and a mirror located at the optical waveguide.

In an exemplary embodiment, the display device may further include a condensing lens unit spaced apart from the light source unit with the microlens array film interposed therebetween and adapted to condense light emitted through the microlens array film.

In an exemplary embodiment, the display device may further include a reflection plate spaced apart from the light source unit with the microlens array film interposed therebetween.

In an exemplary embodiment, the display device may further include a reflection layer disposed to cover a top surface of the microlens array film.

In an exemplary embodiment, at least the microlens array film may be flexible.

BRIEF DESCRIPTION OF THE DRAWINGS

Inventive concepts will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of inventive concepts.

DETAILED DESCRIPTION

Figure 1:
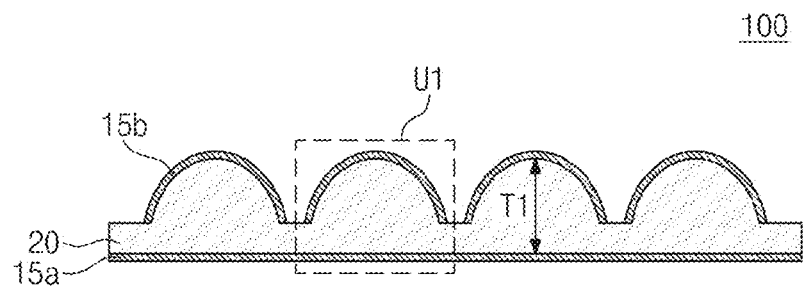
FIG. 1 is a cross-sectional view of a microlens array film according to an embodiment of the inventive concept.

The advantages and features of the inventive concept and methods of achieving them will be apparent from the following exemplary embodiments that will be described in more detail with reference to the accompanying drawings. It should be noted, however, that the inventive concept is not limited to the following exemplary embodiments, and may be implemented in various forms. Accordingly, the exemplary embodiments are provided only to disclose the inventive concept and let those skilled in the art know the category of the inventive concept.

In the specification, it will be understood that when an element is referred to as being "on" another layer or substrate, it can be directly on the other element, or intervening elements may also be present. In the drawings, thicknesses of elements are exaggerated for clarity of illustration.

Exemplary embodiments of the invention will be described below with reference to cross-sectional views, which are exemplary drawings of the invention. The exemplary drawings may be modified by manufacturing techniques and/or tolerances. Accordingly, the exemplary embodiments of the invention are not limited to specific configurations shown in the drawings, and include modifications based on the method of manufacturing the semiconductor device. For example, an etched region shown at a right angle may be formed in a rounded shape or formed to have a predetermined curvature. Therefore, regions shown in the drawings have schematic characteristics. In addition, the shapes of the regions shown in the drawings exemplify specific shapes of regions in an element, and do not limit the invention. Though terms like a first, a second, and a third are used to describe various elements in various embodiments of the inventive concept, the elements are not limited to these terms. These terms are used only to tell one element from another element. An embodiment described and exemplified herein includes a complementary embodiment thereof.

The terms used in the specification are for the purpose of describing particular embodiments only and are not intended to be limiting of the invention. As used in the specification, the singular forms "a", "an" and "the" are intended to include the plural forms as well, unless the context clearly indicates otherwise. It will be further understood that the terms "comprises" and/or "comprising", when used in the specification, specify the presence of stated features, integers, steps, operations, elements, and/or components, but do not preclude the presence or addition of one or more other features, integers, steps, operations, elements, components, and/or groups thereof.

Hereinafter, embodiments of the inventive concept will now be described more fully with reference to accompanying drawings.

FIG. 1 is a cross-sectional view of a microlens array film 100 according to an embodiment of the inventive concept. As illustrated, the microlens array film 100 includes first and second transparent electrodes 15a and 150b facing each other and a flexible polymer layer 20 placed there between. The transparent electrodes 15a and 15b may be made of a nano electrode material such as silver nanowire, carbon nanotube, and graphene. Alternatively, the transparent electrodes 15a and 15b may be made of at least one selected from the group consisting of ITO, IZO, ZnO, $SnO_2$, antimony-doped tin oxide (ATO), Al-doped zinc oxide (AZO), gallium-doped zinc oxide (GZO), $TiO_2$, and fluorine-doped tin oxide (FTO). In this embodiment, at least the second transparent electrode 15b may have flexibility. The flexible polymer layer 20 may be made of an electro-active polymer material that is transparent. In this embodiment, a bottom surface of the flexible polymer layer 20 may be flat while a top surface thereof is non-planar. The first electrode 15a may be in contact with the entire bottom surface of the flexible polymer layer 20. The second electrode 15b may be provided in plurality. The second electrodes 15b may be spaced apart from each other and may cover convex portions of the top surface of the flexible polymer layer 20, respectively. One convex knot of the flexible polymer layer 20 and the second and first electrodes 15b and 15a respectively covering its top and bottom surfaces may constitute a single unit operating part U1.

Figure 2:
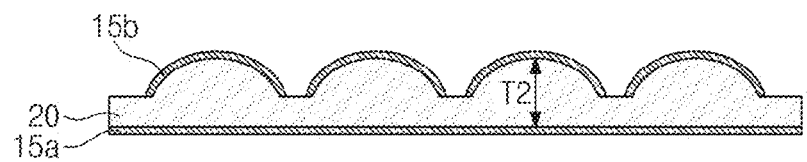
FIGS. 2 to 4 show deformed microlens array films when a voltage is applied to the microlens array film in FIG. 1.
Figure 3:
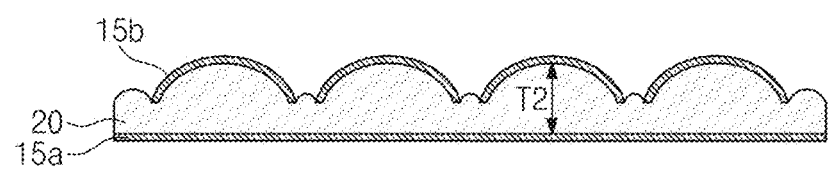
Figure 4:
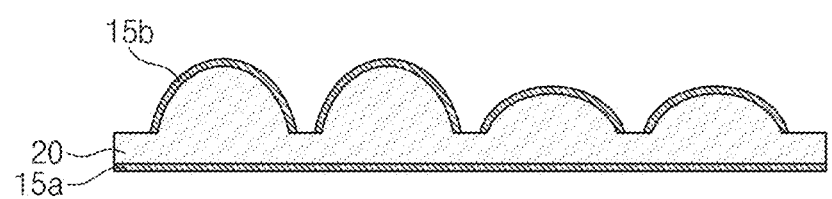

FIGS. 2 to 4 show deformed microlens array films when a voltage is applied to the microlens array film in FIG. 1.

Referring to FIGS. 1 to 4, voltages of opposite signs are applied to the first and second transparent electrodes 15a and 15b, respectively. For example, when a positive voltage is applied to the first transparent electrode 15a, a negative voltage may be applied to the second transparent electrode 15b. As a result, a distance between the first and second transparent electrodes 15a and 15b is reduced by an electrostatic force generated between top and bottom surfaces of the flexible polymer layer 20. Thus, thickness between an uppermost portion and a bottom surface of the flexible polymer layer 20 decreases from T1 to T2. An uncovered depression of the flexible polymer layer 20 may convexly protrude between the second transparent electrodes 15, as shown in FIG. 3. When different voltages are applied to the second transparent electrodes 15b respectively, thickness of the flexible polymer layer 20 may vary depending on position.

Likewise in the microlens array film 100 according to this embodiment, a lens array may be freely deformed or reproducibly maintained by regulating voltages applied to the transparent electrodes 15a and 15b.

Figure 5:
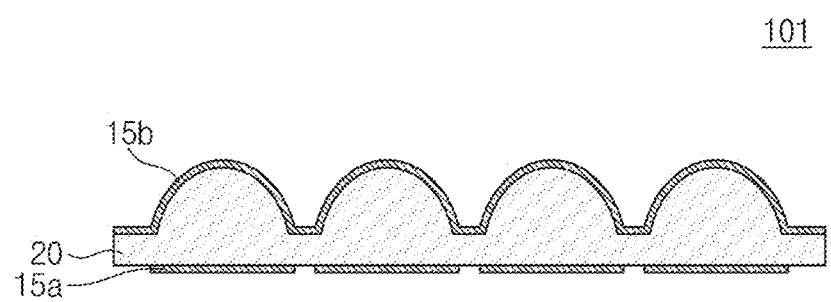
FIGS. 5 to 7 are cross-sectional views of microlens array films according to modified embodiments of the inventive concept.
Figure 6:
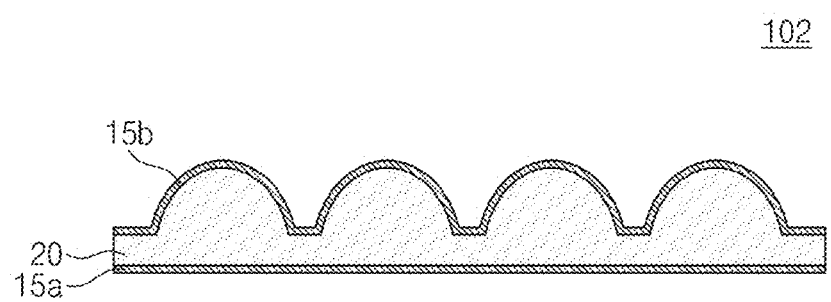
Figure 7:
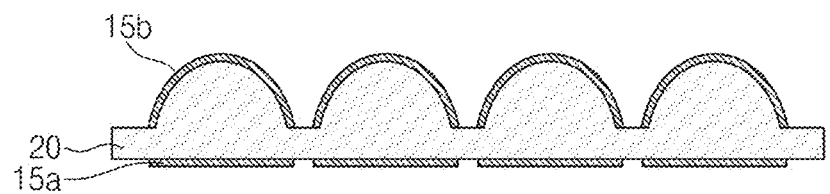

FIGS. 5 to 7 are cross-sectional views of microlens array films according to modified embodiments of the inventive concept.

In a microlens array film 101 in FIG. 5, a first transparent electrode 15a may be provided in plurality. The first transparent electrodes 15a may be spaced apart from each other and may overlap convex portions of a flexible polymer layer 20, respectively. A second transparent electrode 15b may cover the entire top surface of a non-planar structure of the flexible polymer layer 20. The other components and operations may be identical/similar to those explained with reference to FIGS. 1 to 4.

In a microlens array film 102 in FIG. 6, a first transparent electrode 15a may cover the entire bottom surface of a flexible polymer layer 20 and a second transparent electrode 15b may cover the entire top surface of the flexible polymer layer 20. In this case, it may be difficult to perform deformation of FIG. 4. The other components and operations may be identical/similar to those explained with reference to FIGS. 1 to 3.

In a microlens array film 103 in FIG. 7, a first transparent electrode 15a may be provided in plurality. The first transparent electrodes 15a may be spaced apart from each other and may overlap convex portions of a flexible polymer layer 20, respectively. A second transparent electrode 15b may be provided in plurality. The second transparent electrodes 15b may be spaced apart from each other and may overlap convex portions of a top surface of the flexible polymer layer 20, respectively. The other components and operations may be identical/similar to those explained with reference to FIGS. 1 to 4.

Figure 8:
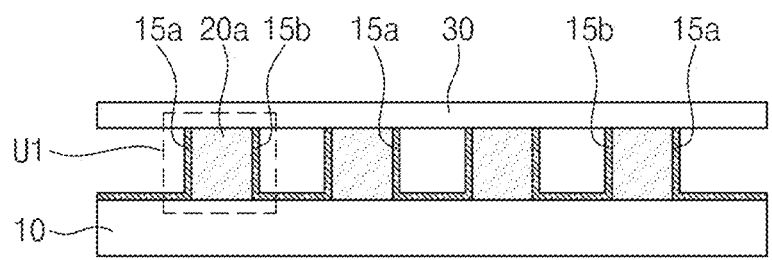
FIG. 8 is a cross-sectional view of a microlens array film according to another embodiment of the inventive concept.

FIG. 8 is a cross-sectional view of a microlens array film 104 according to another embodiment of the inventive concept. As illustrated, the microlens array film 104 includes a first substrate 10 and a second substrate 30 that face each other. A plurality of flexible polymer patterns 20a are disposed to be spaced apart from each other between the first substrate 10 and the second substrate 30. One sidewall of each of the polymer patterns 20a is in contact with a first transparent electrode 15a, and the other sidewall thereof is in contact with a second transparent electrode 15b. Top surfaces of the first and second transparent electrodes 15a and 15b and the flexible transparent patterns 20a are simultaneously in contact with the second substrate 30, and bottom surfaces thereof are simultaneously in contact with the first substrate 10. The top surface of the first substrate 10 between the flexible polymer patterns 20a may be covered with the first and second transparent electrodes 15a and 15b. The bottom surface of the second substrate 30 between the flexible polymer patterns 20a may not be covered with the first and second transparent electrodes 15a and 15b and may be exposed. Both the first and second substrates 10 and 30 may be transparent. At least the second substrate 30 may be flexible. The first substrate 10 may not be flexible. The second substrate 30 may be made of the same material as the flexible polymer patterns 20a. The first and second substrates 10 and 30 are made of an elastic polymer material and may be removable irrespective of the form of a structure or a human body part. In addition, the first and second substrates 10 and 30 may have non-toxic material properties even when they are attached to a human body. The first and second transparent electrodes 15a and 15b may have elasticity.

The flexible polymer patterns 20a may be made of the same material as the flexible polymer layer 20 in FIG. 1. One convex knot of the flexible polymer layer 20 and the second and first electrodes 15b and 15a respectively covering its top and bottom surfaces may constitute a single unit operating part U1. One flexible polymer pattern 20a and the first and second electrodes 15a and 15b respectively covering its both sidewalls may constitute a single unit operating part U1. The other components may be identical/similar to those explained with reference to FIG. 1.

Figure 9:
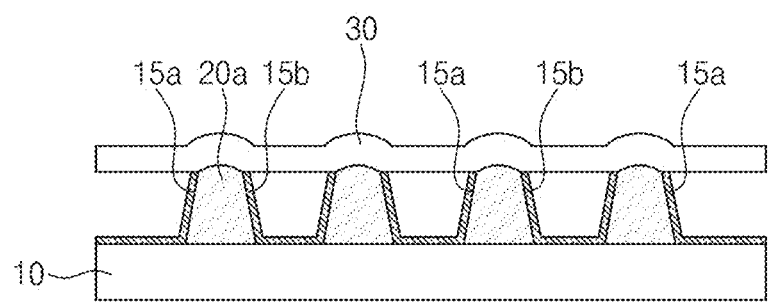
FIGS. 9 and 10 show deformed microlens array films when a voltage is applied to the microlens array film in FIG. 8.
Figure 10:
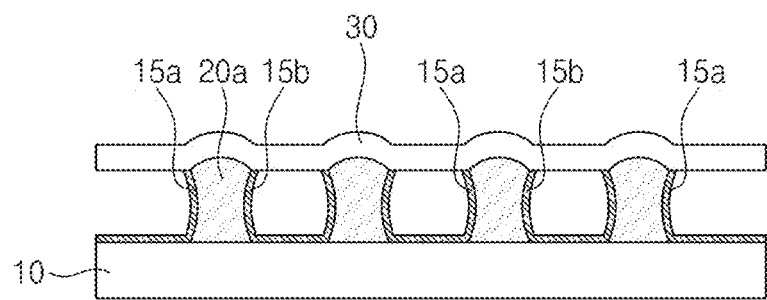

FIGS. 9 and 10 show deformed microlens array films when a voltage is applied to the microlens array film in FIG. 8.

Referring to FIGS. 9 and 10, as explained with reference to FIG. 2, voltages of opposite signs are applied to first and second transparent electrodes 15a and 15b, respectively. A distance between the first and second transparent electrodes 15a and 15b is reduced by an electrostatic force to allow the flexible polymer pattern 20a to protrude upwardly. Thus, a surface of the second substrate 30 may have a non-planar structure. Since the first substrate 10 is not flexible and lower portions of the first and second transparent electrodes 15a and 15b are fixed to cover a top surface of the first substrate 10 as shown in FIG. 8, upper ends of the first and second transparent electrodes 15a and 15b may become close to each other as shown in FIG. 9. Alternatively, a distance between upper ends and lower ends of the first and second transparent electrodes 15a and 15b may be constantly maintained while middle portions of the first and second transparent electrodes 15a and 15b may be made concave as shown in FIG. 10.

Figure 11:
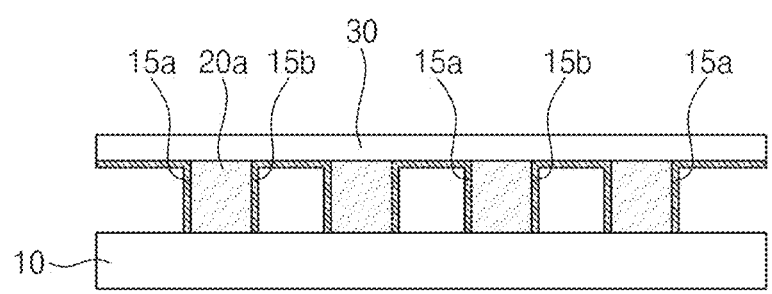
FIGS. 11 to 13 are cross-sectional views of microlens array films according to modified embodiments of the inventive concept.
Figure 12:
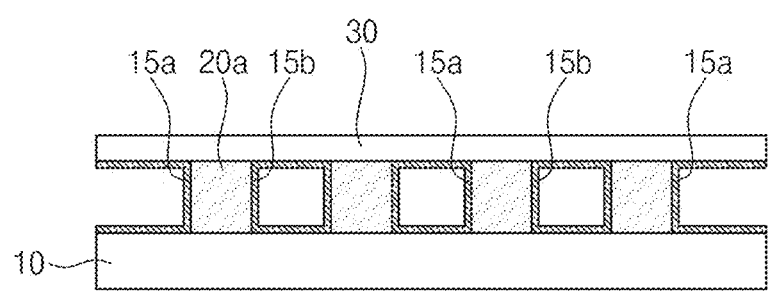
Figure 13:
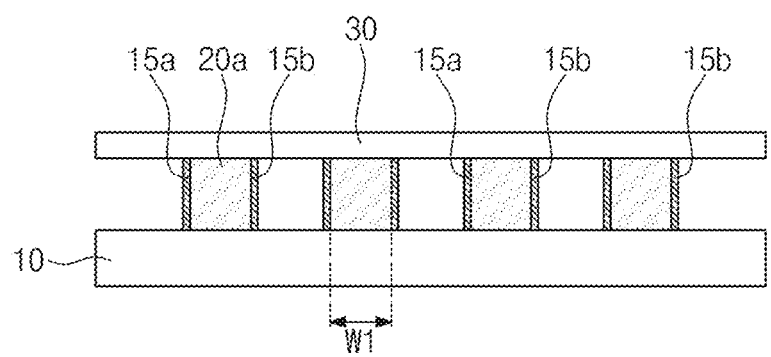
Figure 14:
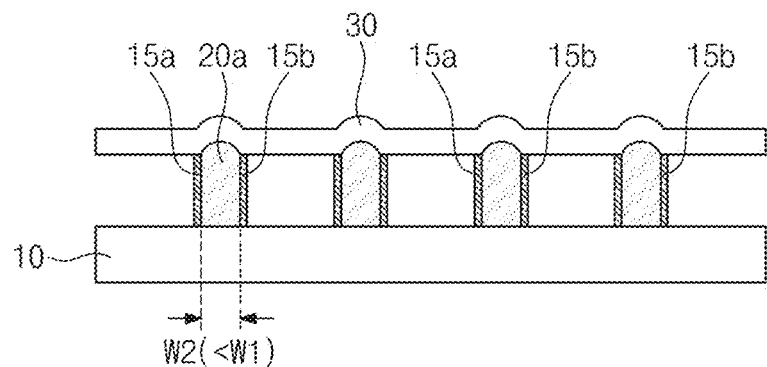
FIG. 14 shows a deformed microlens array film when a voltage is applied to the microlens array film in FIG. 13.

FIGS. 11 to 13 are cross-sectional views of microlens array films according to modified embodiments of the inventive concept, and FIG. 14 shows a deformed microlens array film when a voltage is applied to the microlens array film in FIG. 13.

In a microlens array film 105 in FIG. 11, a top surface of a first substrate 10 between flexible polymer patterns 20a may not be covered with first and second transparent electrodes 15a and 15b and may be exposed. A bottom surface of a second substrate 30 between the flexible polymer patterns 20a may be covered with the first and second transparent electrodes 15a and 15b.

In a microlens array film 106 in FIG. 12, both a top surface of a first substrate 10 between flexible polymer patterns 20a and a bottom surface of a second substrate 30 may be covered with first and second transparent electrodes 15a and 15b.

In a microlens array film 107 in FIG. 13, both a top surface of a first substrate 10 between flexible polymer patterns 20a and a bottom surface of a second substrate 30 may not be covered with first and second transparent electrodes 15a and 15b and may be exposed. When a voltage is applied to the microlens array film 107, the flexible polymer patterns 20a may be deformed as shown in FIG. 9 or 10. Alternatively, width of the flexible polymer patterns 20a may evenly decrease from W1 to W2 irrespective of height as shown in FIG. 14.

Figure 15:
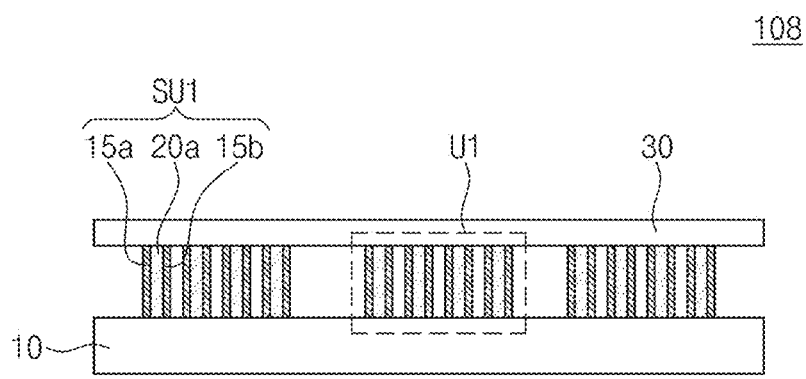
FIG. 15 is a cross-sectional view of a microlens array film according to another embodiment of the inventive concept.

FIG. 15 is a cross-sectional view of a microlens array film 108 according to another embodiment of the inventive concept. In the microlens array film 108, first and second transparent electrodes 15a and 15b and a flexible polymer pattern 20a placed there between constitute a single slit-type sub-unit operating part SU1. A plurality of sub-unit operating parts SU1 may constitute a single unit operating part U1. The sub-unit operating part SU1 may be spaced apart from each other. The unit operating parts U1 may be spaced apart from each other. Although it is shown in FIG. 15 that first and second transparent electrodes 15a and 15b covers only a sidewall of the flexible polymer pattern 20a, they may extend to cover at least one of first and second substrates 10 and 30 as explained in FIGS. 8, 11, and 12.

Figure 16:
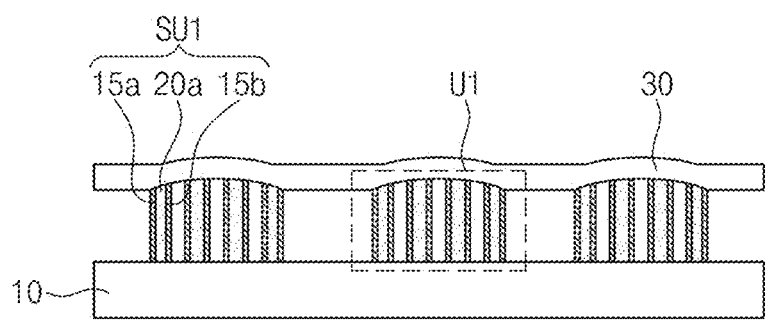
FIG. 16 shows a deformed microlens array film when a voltage is applied to the microlens array film in FIG. 15.

FIG. 16 shows a deformed microlens array film when a voltage is applied to the microlens array film in FIG. 15.

Referring to FIG. 16, flexible polymer patterns 20a may be deformed by applying different voltages to first and second transparent electrodes 15a and 15b included in a sub-unit operating part SU1, respectively. Thus, a second substrate 30 may be formed to have a non-planar structure. An upper end portion of the flexible polymer pattern 20a placed in the center of the sub-unit operation part SU1 may be higher than an upper end portion of the flexible polymer pattern 20a placed at the edge of the sub-unit operating part SU1.

Figure 17:
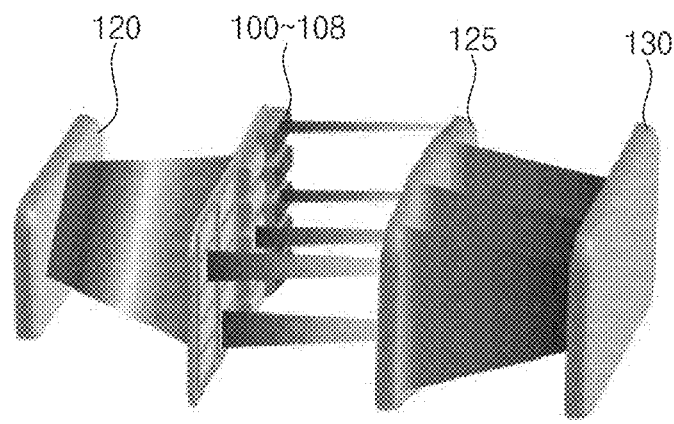
FIG. 17 is a perspective view of a display device according to an embodiment of the inventive concept.

FIG. 17 is a perspective view of a display device 201 according to an embodiment of the inventive concept. As illustrated, the display device 201 includes microlens array films 100-108 described with reference to FIGS. 1 to 16. The display device 201 may further include a light source unit 120, a condensing lens unit 125, and a surface to be irradiated 130. According to purpose of use, the microlens array films 100-108 may be placed between the light source unit 120 and the condensing lens unit 125 or configured to be in combination only with the light source unit 120. When the microlens array films 100-108 are in combination with the light source unit 120 and the condensing lens unit 125, they may serve as an optical modulator that may obtain display with uniform illumination to the surface 130 to be irradiated even when a light source with non-uniform illumination is used. According to purpose, microlens array films 100-108 of two or more films may be used in combination with each other. Since individual lenses of the microlens array films 100-108 may be actively deformed, a light transmission path may be actively controlled and display distortion affected by the shape and angle of the surface 130 to be irradiated may be actively suppressed. Since it is possible to apply a condensing lens which may be actively deformed using electro-active polymer that is a material of the microlens array films 100-108, the condensing lens may replace the existing condensing lens unit 125. Alternatively, it is possible to form a flexible structure in which the light source unit 120, the microlens array films 100-108, and the condensing lens unit 125 are integrated. Since the flexible structure may be effective in a display device with uniform illumination and effective in suppressing display distortion, the flexible structure may be advantageously applied to a display device with critical distortion such as a virtual keyboard or other virtual input devices other than typical display devices. Since lens arrangement and lens size are reconstructible, the microlens array films 100-108 may be actively deformed to various structures according to purpose of use of this lens structure. Moreover, when the microlens array films 100-108 are integrated or combined with the light source unit 120, a three-dimensional display device may be implemented.

When the light source unit 120 is integrated with the microlens array films 100-108, it may be designed as a reflective-type or transmissive-type light source unit. A location of a light source unit, type and location of a light source, and a method of transmitting light to a lens may vary depending on a structure desired to be designed. A light source may employ a light emitting diode, a laser diode or elements based on various light emitting material.

FIGS. 18 to 23 are cross-sectional views of display devices according to other embodiments of the inventive concept.

Figure 18:
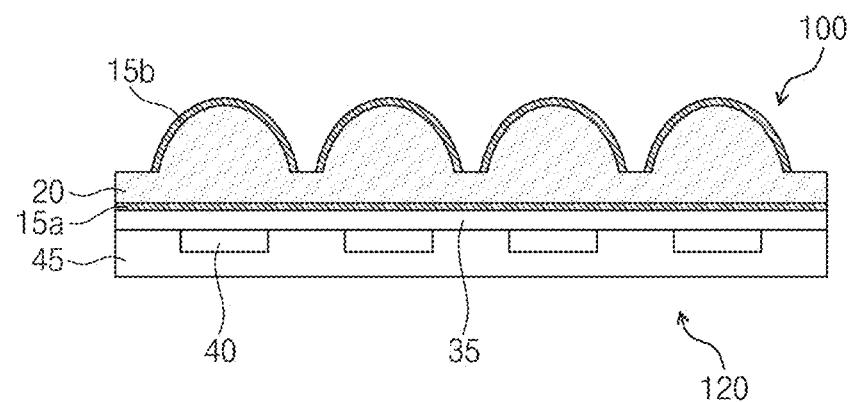
FIGS. 18 to 23 are cross-sectional views of display devices according to other embodiments of the inventive concept.

Referring to FIG. 18, a display device 202 may include, for example, a light source unit 120 placed below the microlens array film 100 in FIG. 1. The light source 120 may include a coupling member 35, a light source element 40, and a light source substrate 45. The coupling member 35 may be, for example, a transparent adhesive. The light source element 40 may be one of various elements such as a light emitting diode (LED). The light source substrate 45 may be used as an optical waveguide.

Figure 19:
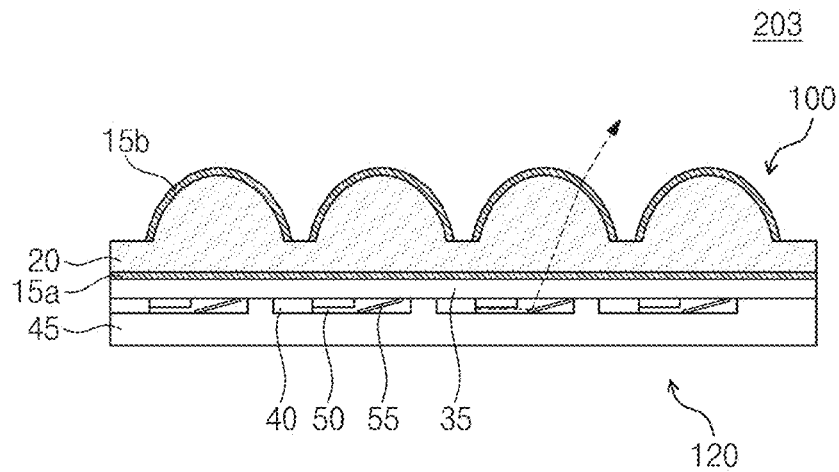

Referring to FIG. 19, a display device 203 may include a light source substrate 45 in which an optical waveguide 50 may be formed. A light source element 40 may be placed at one side of the optical waveguide 50. A minor 55 may be placed at the other side of the optical waveguide 50. After light generated from the light source element 40 travels along the optical waveguide 50, the light may be reflected by the mirror 55 to travel along a dotted arrow through a microlens array film 100. The other elements may be identical/similar to those explained with reference to FIG. 18.

Figure 20:
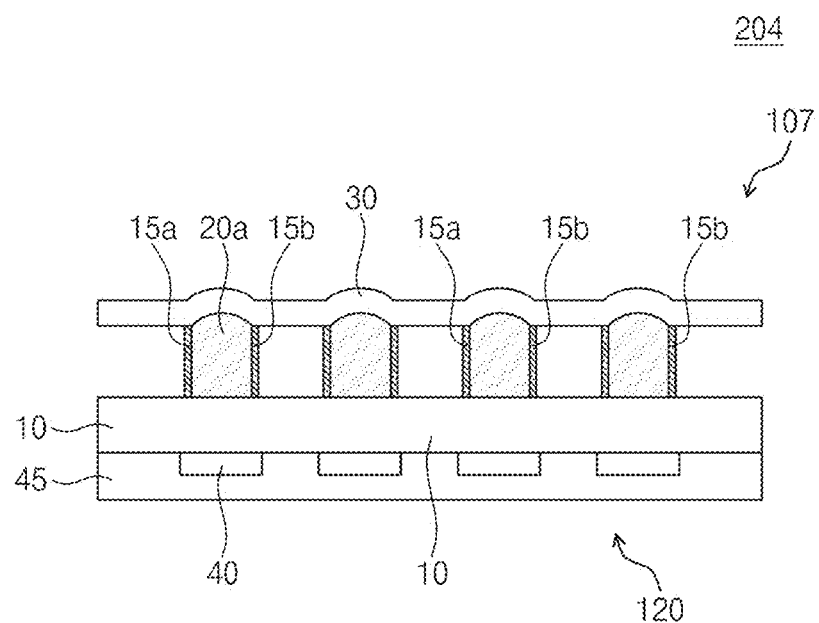

Referring to FIG. 20, a display device 204 may include a light source unit 120 (explained with reference to FIG. 18) that may be placed below the microlens array film 107 in FIG. 14.

Figure 21:
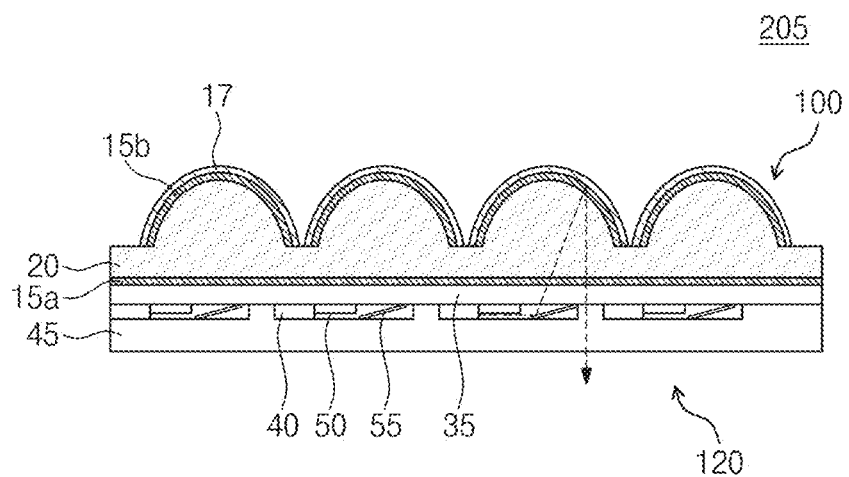

Referring to FIG. 21, a display device 205 may include a reflection layer 17 that may be formed on a top surface of a microlens array film 100, under the same state as shown in FIG. 19. The reflection layer 17 may be made of, for example, a metal allowing light to be readily reflected. The light is generated from a light source element 40. After traveling along an optical waveguide 50, the generated light is reflected by a minor 55 to impinge in the microlens array film 100. The impinging light may be reflected by the reflection layer 17 to travel along a dotted arrow.

Figure 22:
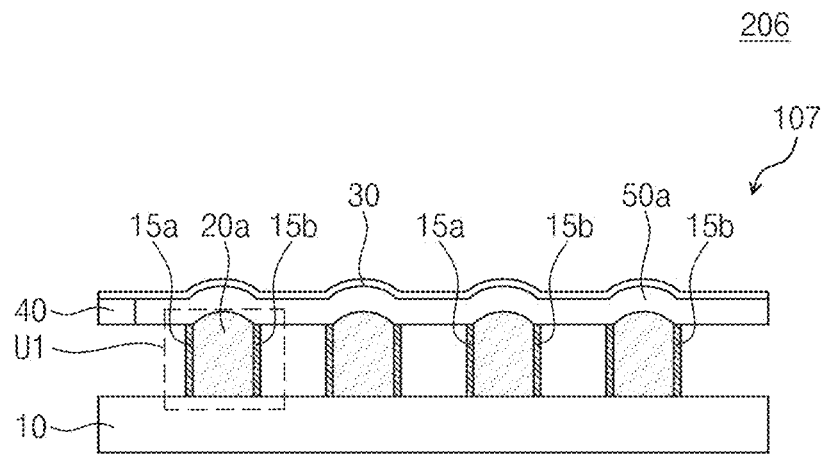

Referring to FIG. 22, a display device 206 includes a microlens array film and a flexible optical element layer 50*a* placed therein, as shown in FIG. 14. That is, the optical element layer 50*a* may be placed between a second substrate 30 and a unit operating part U1. The optical element layer 50*a* may be, for example, a flexible optical fiber. A light source element 40 may be placed at one side of the optical element layer 50*a*.

Figure 23:
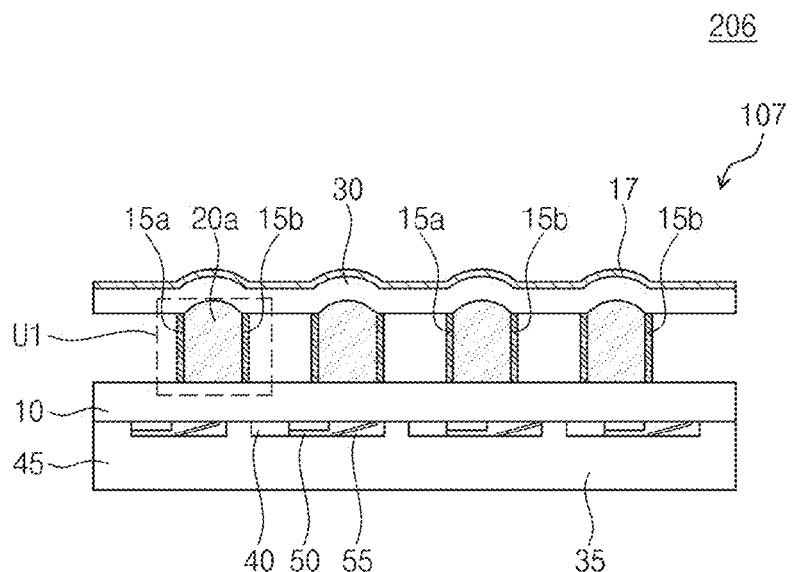

Referring to FIG. 23, a display device 207 includes a microlens array film 107 placed on a light source unit 120 and a reflection layer 17 disposed on the microlens array film 107.

Various microlens array films may be used other than the microlens array film 107 placed on the light source unit 120, as explained with reference to FIGS. 1 to 16.

Figure 24:
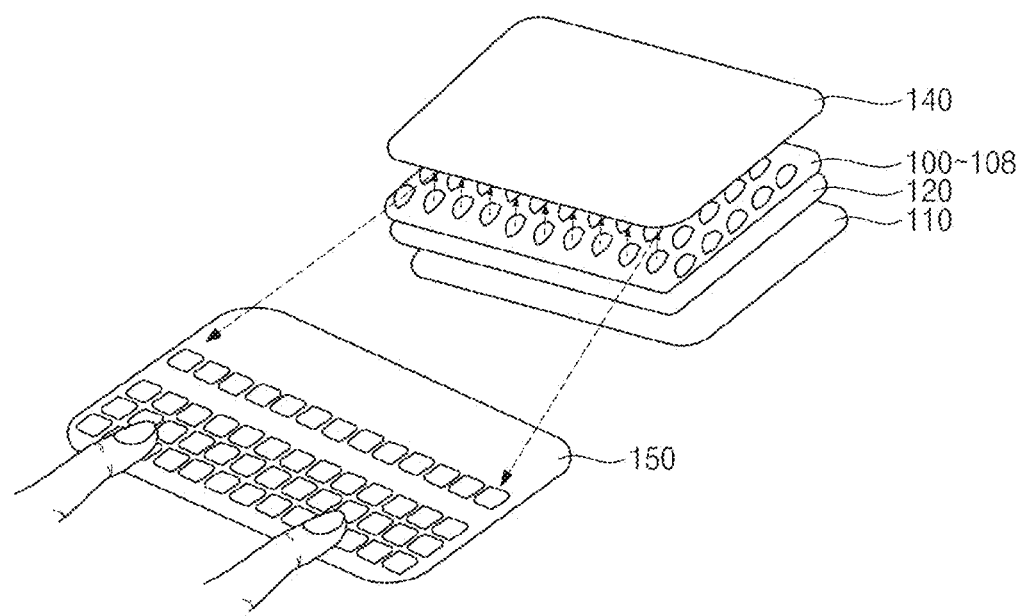
FIGS. 24 to 26 are perspective views of display devices according to other embodiments of the inventive concept.
Figure 25:
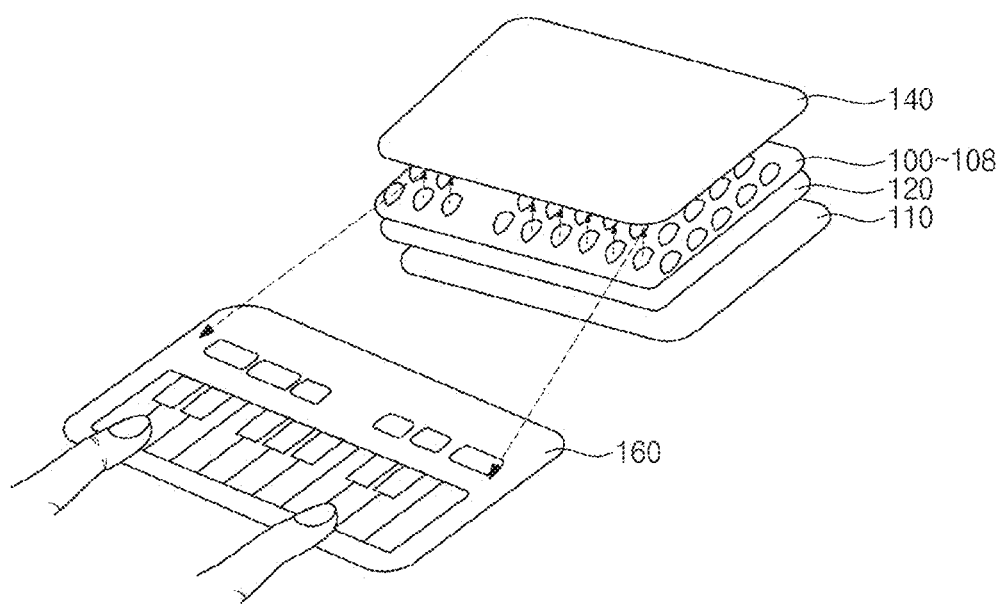
Figure 26:
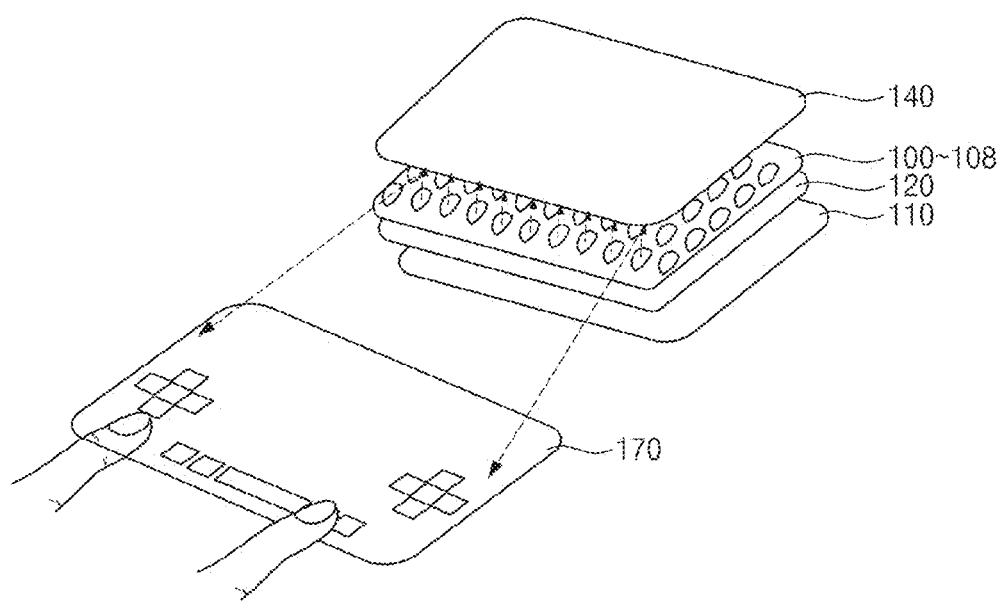

FIGS. 24 to 26 are perspective views of display devices 208-210 according to other embodiments of the inventive concept. As illustrated, each of the display devices 208-210 includes a light source unit 120, microlens array films 100-108, and a reflection plate 140 that are sequentially placed on a substrate 110. Light generated from the light source unit 120 impinges on the reflection plate 140 through the microlens array films 100-108 along dotted arrows. The reflection plate 140 allows the impinging light to be reflected and displayed on a virtual surface. Thus, virtual display devices 150-170 may be implemented. The virtual display devices 150-170 in FIGS. 24 to 26 may be a virtual keyboard 150, a virtual musical instrument 160, and a virtual game control keypad 170, respectively. Likewise, projection of various virtual display devices may be accomplished. Since such a microlens array film may be actively and selectively activated and lens size may be controlled, focal length and phase may be adjusted to effectively implement a virtual display device. In addition, a high-resolution virtual display device may be implemented by implementing a structure where a light source element array and a microlens array match one-to-one in the form of pixel. If a location sensor is mounted on the structure, user touch interaction may be done on a virtual display device. Furthermore, since a flexible and elastic material is used, the display devices 208-210 may be used while being attached to a part of human body or a structure with curvature.

Figure 27:
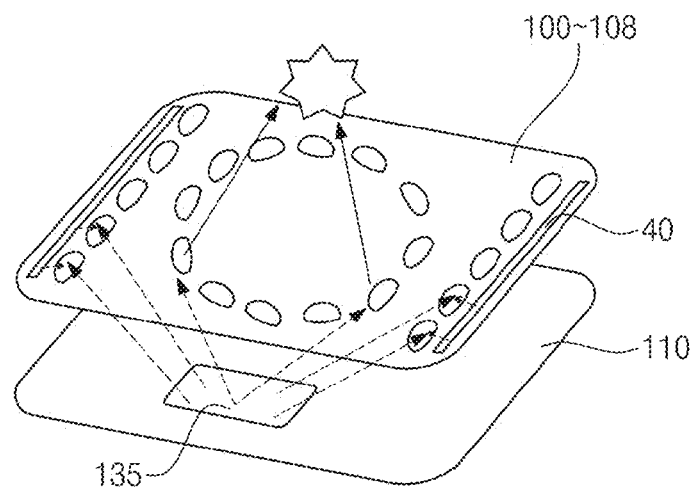
FIGS. 27 and 28 are perspective views of display devices according to other embodiments of the inventive concept.
Figure 28:
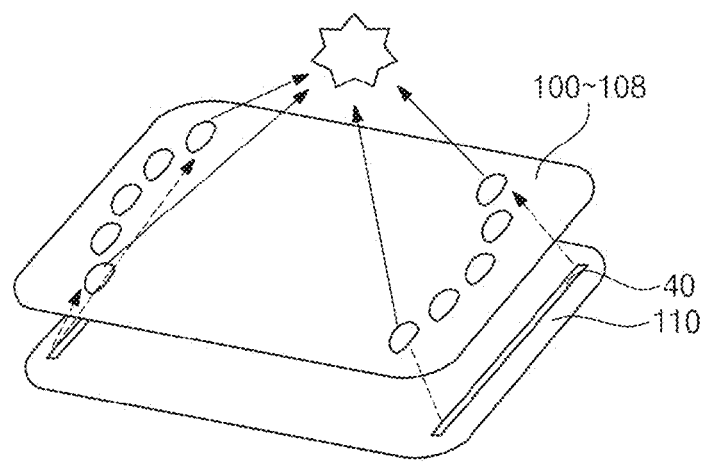

FIGS. 27 and 28 are perspective views of display devices according to other embodiments of the inventive concept.

Referring to FIG. 27, a display device 211 includes a substrate 110, a target 135 placed on the substrate 110 and desired to be three-dimensionally displayed, microlens array films 100-108, and a light source element 40 placed at one side of the microlens array films 100-108. Since the shape of the microlens array films 100-108 is reconstructible, an image of the target 135 may be three-dimensionally displayed on a space through active construction and combination of lenses (unit operating parts).

Referring to FIG. 28, a display device 212 includes a light source element 40, where a light source element 40 is placed, which is placed below microlens array films 100-108. An image may be three-dimensionally displayed on a space by activating only some lenses (unit operating parts) at the edge of the microlens array films 100-108. The light source unit 120 and the microlens array films 100-108 may have flexibility. Thus, when the display device 212 is attached to a part of human body and a structure with curvature, a structure of an active lens may be actively changed depending on deformation of the attached structure. As a result, the display device 212 may be applied to achieve three-dimensional images of display devices in wearable and skin-patch type electronic systems.

As set forth above, the microlens array films 100-108 according to the inventive concept may achieve three-dimensional display in combination with the light source unit 120. In particular, the microlens array films 100-108 may be applied to a hologram display method which is capable of overcoming disadvantages of conventional stereoscopic three-dimensional display.

According to a microlens array film described so far, lenses (unit operating parts) may be freely deformed by regulating a voltage applied to transparent electrodes. Thus, a flexible and reconstructible microlens array film can be implemented. The microlens array film can be applied to virtual display devices and three-dimensional display devices.

While the inventive concepts have been particularly shown and described with reference to exemplary embodiments thereof, it will be apparent to those of ordinary skill in the art that various changes in form and detail may be made therein without departing from the spirit and scope of the inventive concepts as defined by the following claims.

What is claimed is:
1. A microlens array film comprising:
    a first transparent electrode and a second transparent electrode facing each other, at least one of the first and second transparent electrodes including a flat portion;
    a flexible polymer layer having a surface for forming lenses, the flexible polymer layer being placed between the first and the second transparent electrodes;
    a first substrate being in contact with at least a bottom surface of the flexible polymer layer, each of the first and second transparent electrodes being in direct contact with the first substrate; and
    a second substrate being flexible and in contact with at least a top surface of the flexible polymer layer, each of the first and second transparent electrodes being in direct contact with the second substrate,
    wherein a distance between the first transparent electrode and the second transparent electrode is reduced by applying voltages of opposite signs to the first and second transparent electrodes, respectively,
    wherein the surface for forming lenses changes as result of when the distance between the first transparent electrode and the second transparent electrode is reduced.
2. The microlens array film as set forth in claim 1, wherein the first transparent electrode, the flexible polymer layer, and the second transparent electrode constitute a single unit operating part, and
    wherein the microlens array film includes a plurality of unit operating parts placed to be spaced apart from each other between the first and second substrates.
3. The microlens array film as set forth in claim 2, wherein at least one of the first and second transparent electrodes extends to cover at least one of a top surface of the first substrate and a bottom surface of the second substrate.
4. The microlens array film as set forth in claim 1, wherein the first substrate is transparent and flexible.
5. The microlens array film as set forth in claim 1, wherein the flexible polymer layer is made concave laterally when voltages of opposite signs are applied to the first and second transparent electrodes, respectively.

6. The microlens array film as set forth in claim 1, wherein a width of the flexible polymer layer adjacent to the second substrate is made smaller than that of the flexible polymer layer adjacent to the first substrate when voltages of opposite signs are applied to the first and second transparent electrodes, respectively.

7. The microlens array film as set forth in claim 1, further comprising:
   a reflection layer covering the first transparent electrode or the second transparent electrode.

8. A display device comprising:
   a microlens array film set forth in claim 1, and
   a light source unit adjacent to the microlens array film.

9. The display device as set forth in claim 8, wherein the light source unit includes a light source element, an optical waveguide adjacent to the light source element, and a mirror placed at the optical waveguide.

10. The display device as set forth in claim 8, further comprising:
    a condensing lens unit spaced apart from the light source unit with the microlens array film interposed therebetween and adapted to condense light emitted through the microlens array film.

11. The display device as set forth in claim 8, further comprising:
    a reflection plate spaced apart from the light source unit with the microlens array film interposed therebetween.

12. The display device as set forth in claim 8, further comprising:
    a reflection layer placed to cover a top surface of the microlens array film.

13. The display device as set forth in claim 12, wherein at least the microlens array film is flexible.

\* \* \* \* \*